US009710445B2

(12) United States Patent
Liang

(10) Patent No.: US 9,710,445 B2
(45) Date of Patent: Jul. 18, 2017

(54) WEBPAGE DISPLAY METHOD, DEVICE, BROWSER AND USER TERMINAL

(71) Applicant: Jie Liang, Beijing (CN)

(72) Inventor: Jie Liang, Beijing (CN)

(73) Assignee: UC MOBILE LIMITED, Beijing (CN)

( * ) Notice: Subject to any disclaimer, the term of this patent is extended or adjusted under 35 U.S.C. 154(b) by 240 days.

(21) Appl. No.: 14/380,099

(22) PCT Filed: Dec. 21, 2012

(86) PCT No.: PCT/CN2012/087185
§ 371 (c)(1),
(2) Date: Aug. 21, 2014

(87) PCT Pub. No.: WO2013/123810
PCT Pub. Date: Aug. 29, 2013

(65) Prior Publication Data
US 2015/0046802 A1 Feb. 12, 2015

(30) Foreign Application Priority Data
Feb. 22, 2012 (CN) .......................... 2012 1 0042621

(51) Int. Cl.
*G06F 17/27* (2006.01)
*G06F 17/24* (2006.01)
(Continued)

(52) U.S. Cl.
CPC .......... *G06F 17/24* (2013.01); *G06F 3/04845* (2013.01); *G06F 17/214* (2013.01);
(Continued)

(58) Field of Classification Search
CPC .......... G06F 17/2247; G06F 17/30905; G06F 17/214; G06F 3/0485; G06F 17/24;
(Continued)

(56) References Cited

U.S. PATENT DOCUMENTS 7,188,305 B1 * 3/2007 Corbin .............. G06F 17/30899
707/999.2
7,234,107 B1 * 6/2007 Aoki ................... G06F 17/2247
707/E17.121
(Continued)

FOREIGN PATENT DOCUMENTS

CN 1666193 A 9/2005
CN 101221572 A 7/2008
(Continued)

OTHER PUBLICATIONS

THe World Intellectual Property Organization (WIPO) International Search Report for PCT/CN2012/087185 Mar. 28, 2013 6 Pages.

*Primary Examiner* — Wilson Tsui
(74) *Attorney, Agent, or Firm* — Anova Law Group, PLLC

(57) ABSTRACT

The present invention provides a webpage display method, device, browser and user terminal. The method comprises: after a zooming operation performed by the user on a webpage currently being browsed, recording a mapping relationship between a webpage identifier of the webpage and a zoom ratio of the zooming operation; upon detecting that a webpage requested by the user for browsing matches the webpage identifier, retrieving the recorded zoom ratio corresponding to the webpage identifier; and zooming a size of the webpage requested by the user and displaying the webpage. The technical solution achieves the objective of automatically zooming the webpage to a size suitable for the user's browsing, avoiding the extra zooming operation by the user and improving the user experience of webpage browsing.

14 Claims, 4 Drawing Sheets

(51) Int. Cl.
*G06F 17/30* (2006.01)
*G06F 3/0484* (2013.01)
*G06F 17/21* (2006.01)

(52) U.S. Cl.
CPC .................. *G06F 17/30905* (2013.01); *G06F 2203/04806* (2013.01)

(58) Field of Classification Search
CPC ......... G06F 17/04845; G06F 17/30873; G06F 2203/04806; G06F 17/3089; G06F 17/211
See application file for complete search history.

(56) References Cited

U.S. PATENT DOCUMENTS

| | | | | |
|---|---|---|---|---|
| 7,487,447 | B1* | 2/2009 | Jerger | G06F 3/0481 715/252 |
| 8,229,977 | B1* | 7/2012 | Anderson | G06F 17/3089 707/805 |
| 8,839,117 | B1* | 9/2014 | Smith | H04N 1/00973 715/745 |
| 2002/0016830 | A1* | 2/2002 | Nicolai | G06F 17/30867 709/219 |
| 2003/0216929 | A1* | 11/2003 | Brockway | G06F 17/30867 705/326 |
| 2004/0075671 | A1 | 4/2004 | Vale et al. | |
| 2005/0065913 | A1* | 3/2005 | Lillie | G06F 17/30873 |
| 2005/0193053 | A1* | 9/2005 | Kendall | G06F 17/30905 709/200 |
| 2008/0109619 | A1* | 5/2008 | Nakanishi | G06F 11/1469 711/159 |
| 2008/0175075 | A1 | 7/2008 | La Rosa | |
| 2008/0252622 | A1* | 10/2008 | Tai | G09G 3/3674 345/204 |
| 2012/0110438 | A1* | 5/2012 | Peraza | G06F 17/214 715/243 |

FOREIGN PATENT DOCUMENTS

| | | |
|---|---|---|
| CN | 101373470 A | 2/2009 |
| CN | 101673303 A | 3/2010 |
| CN | 101739194 A | 6/2010 |
| CN | 102314502 A | 1/2012 |
| CN | 102622423 A | 8/2012 |

\* cited by examiner

WEBPAGE DISPLAY METHOD, DEVICE, BROWSER AND USER TERMINAL

CROSS REFERENCE TO RELATED APPLICATIONS

This application is a national stage of PCT Patent Application PCT/CN2012/087185, filed on Dec. 21, 2012, which claims the priority of Chinese Patent Application No. 201210042621.7, filed on Feb 22, 2012, the entire contents of all of which are incorporated herein by reference.

FIELD OF THE INVENTION

The present invention generally relates to mobile communication field and, more particularly, to a webpage display method, device, browser and user terminal.

BACKGROUND

Currently, when a user browses webpages on a mobile terminal, because a display screen of the mobile terminal may be relatively small, while such webpages are designed and intended for much larger terminal screen, the user needs to perform zooming operations on the webpages. As each webpage has a diversified style, it requires different zoom ratios for optimally viewing different webpages. Existing techniques usually use double click to enlarge the webpages, at the browser's default zoom ratio. But such default zoom ratio is often not dynamically adjustable to accommodate different webpages, and cannot be used to zoom every webpage to a size suitable to the user's particular mobile terminal screen. To achieve desired webpage browsing experience, the user often needs to manually perform extra zooming operations while browsing a webpage, making it cumbersome for webpage browsing operations and lowering the user experience during the webpage browsing process.

However, to the above existing technology's problem that, when the user again browses a same webpage, the user needs to perform extra zooming operations, which cause cumbersome webpage browsing operations, there is yet to be provided with effective solutions.

BRIEF SUMMARY OF THE INVENTION

For the problem that, when the user again browses a same webpage, the user needs to perform extra zooming operations, which cause cumbersome webpage browsing operations, the present invention provides a webpage display method, device, browser, and user terminal to solve at least the above problems.

One aspect of the present invention is to provide a webpage display method, including: after a zooming operation performed by the user on a webpage currently being browsed, recording a mapping relationship between a webpage identifier of the webpage and a zoom ratio of the zooming operation; upon detecting a webpage requested by the user for browsing matches a recorded webpage identifier, retrieving the previously recorded zoom ratio corresponding to the webpage identifier of the webpage; zooming a size of the webpage requested by the user according to the retrieved zoom ratio and displaying the webpage.

Preferably, after zooming a size of the webpage requested by the user according to the retrieved zoom ratio and displaying the webpage, the method also includes: detecting a user's zooming operation on the webpage requested by the user; responding to the user's zooming operation and zooming the size of the webpage requested by the user; and updating the zoom ratio corresponding to the webpage identifier to the zoom ratio of the current zooming operation in the mapping relationship.

Preferably, the webpage identifier includes a domain name of the webpage or a unified resource locator (URL) of the webpage.

Preferably, prior to zooming the size of the webpage according to the retrieved zoom ratio, the method also includes: prompting the user to confirm whether to zoom the size of the webpage currently being browsed according to the zoom ratio; when confirmed, zooming the size of the webpage requested by the user according to the retrieved zoom ratio; and when not confirmed, zooming the size of the webpage requested by the user according to the pre-configured zoom ratio.

Another aspect of the present invention is to provide a webpage display device, including: a recording module configured to, after a zooming operation performed by the user on a webpage currently being browsed, record the mapping relationship between a webpage identifier of the webpage and a zoom ratio of the zooming operation; a retrieving module, configured to, upon detecting that a webpage requested by the user for browsing matches the webpage identifier, retrieve the recorded zoom ratio corresponding to the webpage identifier of the webpage; a zooming module configured to zoom a size of the webpage requested by the user according to the retrieved zoom ratio; a displaying module configured to display the webpage requested by the user according to the zoomed size.

Preferably, the device also includes a detecting module configured to, after the displaying module displays the webpage requested by the user, detect a user's zooming operation on the webpage requested by the user; the zooming module is also configured to respond to the user's zooming operation and zoom the size of the webpage requested by the user according to the zooming operation; and the device also includes an updating module configured to update the zoom ratio corresponding to the webpage identifier in the mapping relationship to the zooming ratio of the current zooming operation.

Preferably, the device also includes: a confirmation module configured to, before the zooming module zooms the webpage requested by the user, prompt the user to confirm whether to zoom the size of the webpage requested by the user according to the zoom ratio; when confirmed, the zooming module is triggered to zoom the size of the webpage requested by the user according to the retrieved zoom ratio; and when not confirmed, the zooming module is triggered to zoom the size of the webpage requested by the user according to the pre-configured zoom ratio.

Preferably, the webpage identifier includes a domain name of the webpage or a unified resource locator (URL) of the webpage.

According to another aspect of the present invention, there provides a browser which includes the above device.

According to another aspect of the present invention, there provides a user terminal which includes the above browser.

According to another aspect of the present invention, there provides a webpage display method, including: after a zooming operation performed by the user on a webpage currently being browsed, recording a mapping relationship between a webpage identifier of the webpage and font scaling information; upon detecting that a webpage requested by the user matches the webpage identifier, retrieving the recorded font scaling information corresponding to the webpage identifier, and calculating the zoom ratio of the webpage requested by the user according to the retrieved font scaling information and the current font size of the webpage requested by the user; zooming a size of the webpage requested by the user according to the zoom ratio and displaying the webpage.

Preferably, the font scaling information includes the font size after a zooming operation is performed; and the zoom ratio is determined by using a formula of:: $Y_1=X_1/X_2$, wherein, Y is the zoom ratio, $X_1$ is the font size after the zooming operation is performed, $X_2$ is the current font size of the webpage requested by the user.

Preferably, the font scaling information includes a font size before the zooming operation is performed and a font zoom ratio for performing the zooming operation; and the zoom ratio is determined by using a formula of:: $Y_3=X_3*Y_2/X_4$, wherein, $Y_3$ is the zoom ratio, $X_3$ is the font size before the zooming operation is performed, $Y_2$ is the font zoom ratio for performing the zooming operation, $X_4$ is the current font size of the webpage requested by the user.

Preferably, after zooming the size of the webpage requested by the user according to the zoom ratio and displaying the webpage, the method also includes: detecting the user's zooming operation on the webpage requested by the user; responding to the user's zooming operation and zooming the size of the webpage requested by the user; updating the font scaling information corresponding to the webpage identifier in the mapping relationship to the font scaling information of the current zooming operation.

Preferably, the webpage identifier includes a domain name of the webpage or a unified resource locator (URL) of the webpage.

According to another aspect of the current invention, there provides a webpage display device, including: a recording module configured to, after a zooming operation performed by the user on a webpage currently being browsed, record a mapping relationship between a webpage identifier of the webpage and a font scaling information; a retrieving module configured to, upon detecting that a webpage requested by the user for browsing matches the webpage identifier, retrieve the recorded font scaling information corresponding to the webpage identifier; a calculating module configured to calculate the zoom ratio of the webpage requested by the user according to the retrieved font scaling information and the current font size of the webpage requested by the user; a displaying module configured to zoom a size of the webpage requested by the user according to the zoom ratio and display the webpage.

According to the present invention, when a zooming operation is performed by the user on a webpage currently being browsed, a mapping relationship between a webpage identifier of the webpage and a zoom ratio of the zooming operation is recorded. When the user requests to browse the same webpage next time, the recorded zoom ratio corresponding to the webpage identifier is retrieved, the size of the webpage is zoomed according to the retrieved zoom ratio, and the zoomed webpage is displayed. As a result, when the user browses a webpage, the webpage is zoomed to the size compatible with the webpage, which avoids extra zooming operations by the user and improves the user experience of webpage browsing.

BRIEF DESCRIPTION OF THE DRAWINGS

The drawings described hereinafter are used to provide further understanding of the present invention and constitute a part of this application. The exemplary embodiments of the present invention and their descriptions are used to explain the present invention and do not constitute undue limitations. In the drawings.

DETAILED DESCRIPTION

The followings, together with accompanying drawings, describe in detail certain embodiments of the present invention. It should be noted that, when there is no conflict, the disclosed embodiments and features in the embodiments may be combined among one another.

For the problem of the prior art that, when the user again browses a same webpage, the user needs to repeatedly perform zooming operations on the same webpage, which causes cumbersome webpage browsing operations, the disclosed embodiments provide a webpage display method and device to intelligently record the webpages zoomed by the user and their corresponding zoom ratios. When the user browses again the same webpage, the size of the webpage can be adjusted based on the previously recorded zoom ratio, and the webpage being browsed by the user is displayed at the adjusted size so that the extra zooming operation by the user can be avoided and the user experience of web browsing can be improved.

The following specific embodiments illustrate the present invention.

Embodiment One

According to the embodiment of the present invention, there provides a webpage display method, which zooms the size of the webpage based on the history of zooming operations on the same webpage by the user, and displays the zoomed webpage. The webpage browsing operations can be simplified and the user experience can be improved.

Figure 1:
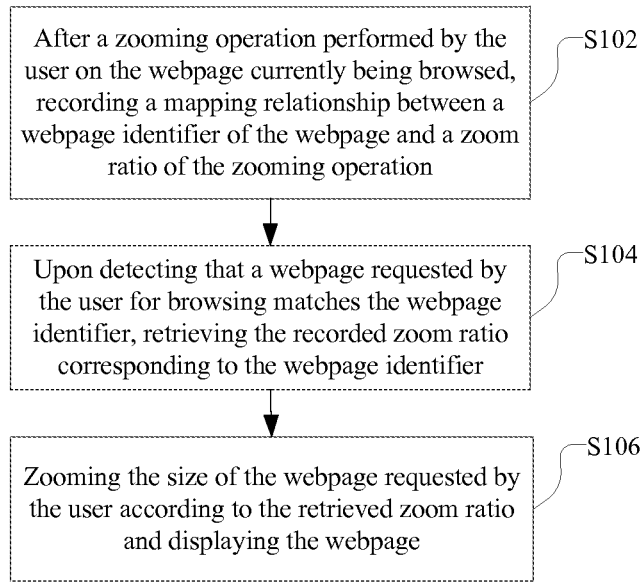
FIG. 1 illustrates a flow chart of a webpage display method according to the embodiment of the present invention.

FIG. 1 illustrates a flow chart of a webpage display method according to the embodiment of the present invention. As shown in FIG. 1, the method includes the following steps (S102 to S106).

Step S102, after a zooming operation performed by the user on a webpage currently being browsed, recording a mapping relationship between a webpage identifier of the currently browsed webpage and a zoom ratio of the zooming operation.

Step S104, upon detecting that a webpage requested by the user for browsing matches the webpage identifier, retrieving the recorded zoom ratio corresponding to the webpage identifier of the webpage.

Step S106, zooming the size of the webpage requested by the user according to the retrieved zoom ratio and displaying the webpage.

According to the embodiment of the present invention, after receiving the user's request to browse the webpage, the webpage currently being browsed by the user is zoomed according to the recorded zoom ratio of the webpage previously browsed. The webpage is automatically zoomed to the user's preference. The extra zooming operations by the user can be avoided and the user experience of web browsing can be improved.

In the embodiment of the present invention, the above mapping relationship between the webpage and the zoom ratio can be configured according to the zoom ratio setting set by the user when previously browsing the webpages or can be acquired from an external source. For example, for different types of mobile terminals, using the statistical collection of suitable zoom ratios when individual type of mobile terminal is used to browse different webpages, the mapping relationships between the webpages and the zoom ratios can be acquired, which can then be downloaded to the mobile terminal through either a network or an external storage device. Alternatively, such mapping relationships can be stored inside the browser client side of the mobile terminal, and can then be updated to reflect the zoom ratio of the current zooming operation after the user browses a webpage and performs a zooming operation on the same webpage.

In a preferred embodiment of the present invention, if the zoom ratio corresponding to the webpage identifier of the current webpage is absent in the stored mapping relationships between the webpage identifiers and the zoom ratios, a pre-configured zoom ratio (e.g., browser default zoom ratio) can be used to zoom the size of the current webpage. If the webpage adjusted according to pre-configured zoom ratio is not suitable for the user's browsing, the user can perform zooming operations on the webpage to accommodate browsing preference. In response to the user's zooming operation, the zooming operation can be performed to the size of the current webpage. After the zooming is completed, the mapping relationship between the webpage identifier of the current webpage and the zoom ratio of the current zooming operation is recorded in the stored mapping relationships between the webpage identifiers and the zoom ratios. When the user browses the current webpage next time, the previously recorded zoom ratio is used to display the webpage and subsequent extra zooming operation by the user can be avoided.

The user performs zooming operations and adjusts the sizes of the webpages for the purpose of suitable viewing. The acquired zoom ratio should be a suitable ratio. In other words, after performing the zooming operation, the user thinks the zoom ratio is suitable for viewing. Further, after the webpage is displayed according to the history zoom ratio of the webpage browsed by the user, the user can perform additional zooming operations on the webpage and make it more suitable for viewing. Therefore, when the zoom ratio for the webpage initially displayed is not suitable for the user's viewing, the user can perform zooming operations to adjust the size of the webpage and make the zoom ratio for webpage displaying suitable for the user's viewing.

In a preferred embodiment of the present invention, after the webpage is displayed according to the zoomed size, any further zooming operation by the user on the current webpage can be detected. If the user's zooming operation is detected, the system responds to the user's zooming operation and zooms the size of the webpage according to the user's zooming operation. Furthermore, the zoom ratio corresponding to the webpage identifier of the current webpage in the stored mapping relationship between the current webpage identifier and the zoom ratio can be updated to the zoom ratio of the current zooming operation. When the user browses the current webpage next time, the webpage can be displayed according to the updated zoom ratio. Subsequently, the extra zooming operation by the user can be avoided.

In the preferred embodiment described above, the mapping relationships between webpage identifiers and zoom ratios are stored. In responding to the user's request to browse a webpage, the zoom ratio corresponding to the webpage identifier of the current webpage is retrieved from the recorded mapping relationships between the webpage identifiers and the zoom ratios. According to the zoom ratio from the user's last webpage browse, the current webpage is zoomed to make it suitable for the user's viewing. In the above described mapping relationships, the same webpage maps to one zoom ratio. In a preferred implementation of the embodiment of the present invention, domain names of webpages can be used as the webpage identifiers of different webpages. The webpages which share the same domain name map to one zoom ratio and the zoom ratio is recorded under the domain name of the webpages. Further, the unified resource locator (URL) of the webpage can also be used as the webpage identifier of the webpage. The webpages which share the same unified resource locator (URL) maps to one zoom ratio and the zoom ratio is recorded under the unified resource locator (URL) of the webpages. Hence the stored mapping relationships between the webpage identifiers and the zoom ratios are the mapping relationships between either the domain names of the webpages or the unified resource locators (URLs) of the webpages and the zoom ratios of the webpages.

For example, when the domain names of the webpages are used as the webpage identifiers of different webpages, and when responding to the user's request to browse a webpage, the domain name of the webpage requested by the user can be used to search for the corresponding zoom ratio of the current webpage in the stored mapping relationships between the webpage identifiers and the zoom ratios, and the zoom ratio of the webpage requested by the user can be retrieved. In practice, it may be preferred that the domain names are used as the webpage identifiers of different webpages.

In the embodiment described above, the webpage can be zoomed according to the history zoom ratio of the user, and the zoomed webpage is directly displayed. However, such operation is not fixed. Before zooming the size of the webpage according to the retrieved zoom ratio, it can also prompt the user to confirm whether to adjust the size of the webpage according the stored zoom ratio. If confirmed, the size of the webpage can be zoomed according to the retrieved zoom ratio. If not confirmed, the size of the webpage can be zoomed according to the pre-configured zoom ratio (e.g., a browser default zoom ratio). In practice, in order to achieve the automatic and intelligent effect, the described method presents to the user the recorded zoom ratio in a most natural manner. Preferably, it skips the prompt to the user for selection prior to displaying the webpage, avoiding subsequent extra operation by the user.

Embodiment Two

In the embodiment of the present invention, if the zoom ratio the user initially uses to open the webpage cannot achieve the desired effect of the webpage display, the user performs zooming operations on the webpage and makes it suitable for viewing. The domain name (or URL) of the webpage and the zoom ratio after the adjustment are recorded. When the user opens the webpage under the domain name next time, it automatically zooms according to the recorded zoom ratio. If such direct click zooming is suitable for viewing, the recorded zoom ratio is the default zoom ratio. If the user adjusts the zoom ratio of a webpage using two finger pinch zooming or zoom button or other zooming mechanisms, the most suitable webpage ratio after the user's extra operation is recorded. The webpage display method according to the embodiment of the present invention can include the following steps (step one through step four).

Step one, detecting if the user performs the zooming operation using either two finger pinch zooming or zoom button.

Step two, after the user performs a zooming operation, executing the zooming operation of the webpage, and recording the zoom ratio of the zooming operation and the domain name of the current webpage in a local file.

In the embodiment of the present invention, only the zoom ratio of the last zooming operation by the user may be recorded. Once an operation is performed, it is recorded. Next time the webpage is displayed using the recorded ratio. If the user makes adjustment again, the result of the last adjustment by the user is recorded. The last zoom ratio adjustment operation by the user under the domain name of the current webpage is automatically recorded, and any further adjustment leads to further automatic recording.

Further, in addition to using domain names for recording, the described method also uses URLs for recording. Using URLs for recording, the zoom ratio for each individual webpage can be recorded while using the domain name for recording lets all webpages under the same domain name share one zoom ratio. In practical applications, using URLs for recording, the zoom ratio of the webpages can be recorded more precisely although the resulting record data may be substantial. Using domain name for recording yields less record data. Usually, the webpages under the same domain name have similar page formatting style, which allows to record the zoom ratio with compact record data. In practical applications, it may be preferred to use the domain names for recording.

Step three, when the user opens a webpage, it is preferable to search for the presence of the domain name of the webpage in the local file. If the domain name of the webpage is present, retrieving the corresponding zoom ratio and applying the zoom ratio as the zoom ratio of the webpage. If the domain name of the webpage is absent, using the system default zoom ratio as the zoom ratio of the webpage.

Step four, if the opened webpage is a wap type, directly opening the webpage at its page enlarging ratio. If the webpage is a www type, when opening the webpage by single click or double click on the minimized icon or the thumbnail, using the page enlarging ratio to open the webpage.

It should be noted that the above described steps are not fixed. Alternatively, a button can be displayed to prompt the user to confirm whether to enlarge the webpage according to the last recorded zoom ratio. But, in order to achieve the automatic and intelligent effect, it is preferred to present to the user again the recorded zoom ratio in a most natural manner. So the user will not perceive the extra operation.

Embodiment Three

Corresponding to the webpage display methods provided in the above embodiments of the present invention, this embodiment of the invention also provides a webpage display device, which can be embedded in the browser of a mobile terminal as an implementation of the above methods.

Figure 2:
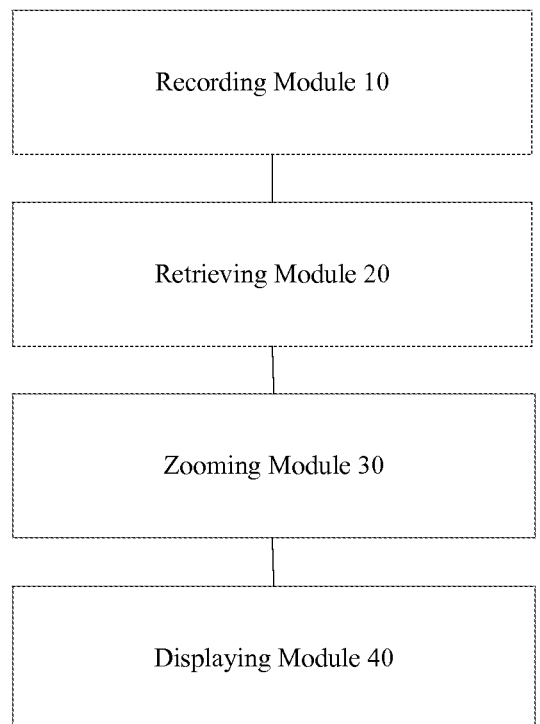
FIG. 2 illustrates a block diagram of a webpage display device according to the embodiment of the present invention.

FIG. 2 illustrates a block diagram of a webpage display device according to the embodiment of the present invention. As shown in FIG. 2, the device includes: a recording module 10, a retrieving module 20, a zooming module 30, and a displaying module 40. Among them, the recording module 10 may be configured to, after a zooming operation performed by the user on a webpage currently being browsed, record a mapping relationship between a webpage identifier of the webpage and a zoom ratio of the zooming operation. The retrieving module 20 is configured to, upon detecting that a webpage requested by the user for browsing matches the webpage identifier, retrieve the recorded mapping relationship between the webpage identifier of the webpage and the zoom ratio. The zooming module 30 is coupled with retrieving module 20 and is configured to zoom the size of the webpage requested by the user according to the retrieved zoom ratio. The displaying module 40 is coupled with zooming module 30 and is configured to display the webpage according to the zoomed size.

In the embodiment of the present invention, the recording module 10, after a zooming operation performed by the user on a webpage, records a mapping relationship between a webpage identifier of the webpage and a zoom ratio of the zooming operation. The retrieving module 20, in response to the user's request to browse a webpage again, retrieves the zooming ratio corresponding to the webpage identifier of the webpage from the mapping relationship between the webpage identifier and the zoom ratio recorded in the recording module 10. The zooming module 30 zooms the size of the webpage according to the retrieved zoom ratio. The displaying module 40 displays the zoomed webpage. This process directly zooms the webpage to the size suitable for the user's browsing. The extra zooming operation by the user can be avoided and the user experience of the webpage browsing can be improved.

Figure 3:
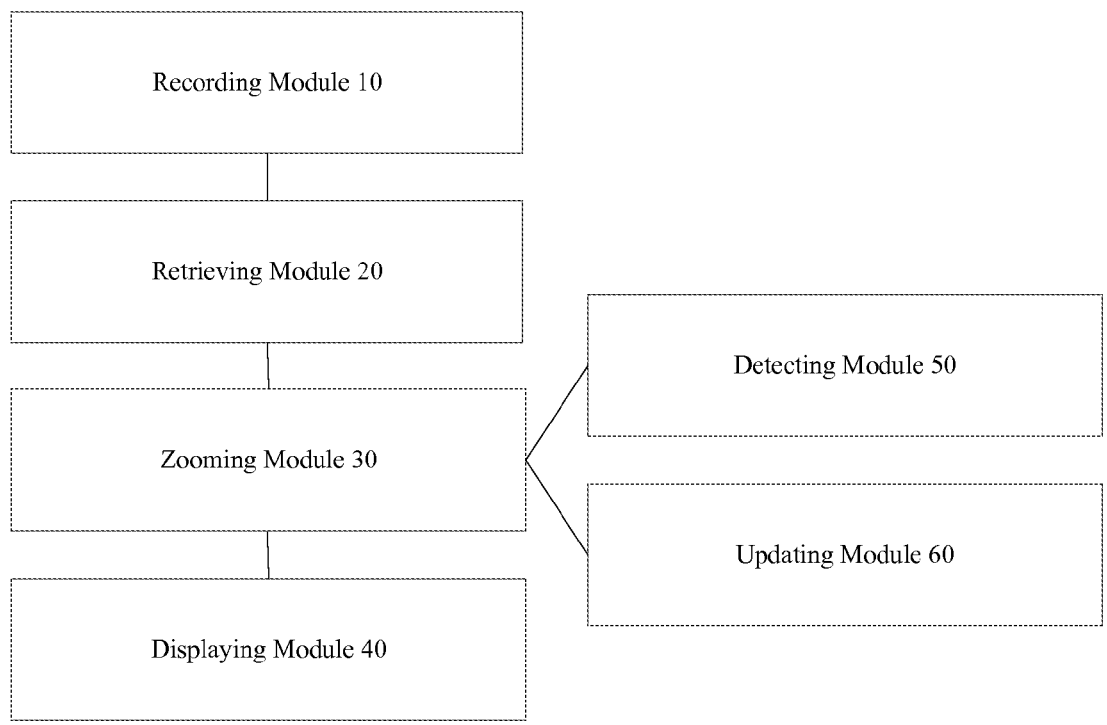
FIG. 3 illustrates a block diagram of a preferred webpage display device according to the embodiment of the present invention.

FIG. 3 illustrates a block diagram of a preferred webpage display device according to the embodiment of the present invention. As shown in FIG. 3, the device also includes: a detecting module 50, configured to detect the user's further zooming operation on the webpage after the displaying module 40 displays the webpage according to the zoomed size; if a zooming operation is detected, the zooming module 30 is triggered. The zooming module 30 is configured to respond to the zooming operation by the user and zoom the size of the webpage according to the zooming operation. Further, the device also includes: an updating module 60, configured to update the zoom ratio corresponding to the webpage identifier of the current webpage to the zoom ratio corresponding to the current zooming operation in the stored mapping relationship between the webpage identifier and the zoom ratio of the zooming operation. If the size of the webpage displayed by the zooming module according to the zoom ratio of previous browsing is not suitable for the user's browsing and the user performs additional zooming on the webpage, according to the preferred embodiment, the zoom ratio of the webpage is updated. When the user opens the webpage next time, it zooms and displays the webpage according to the updated zoom ratio, making the webpage display more suitable for the user's browsing and further improving the user experience.

Figure 4:
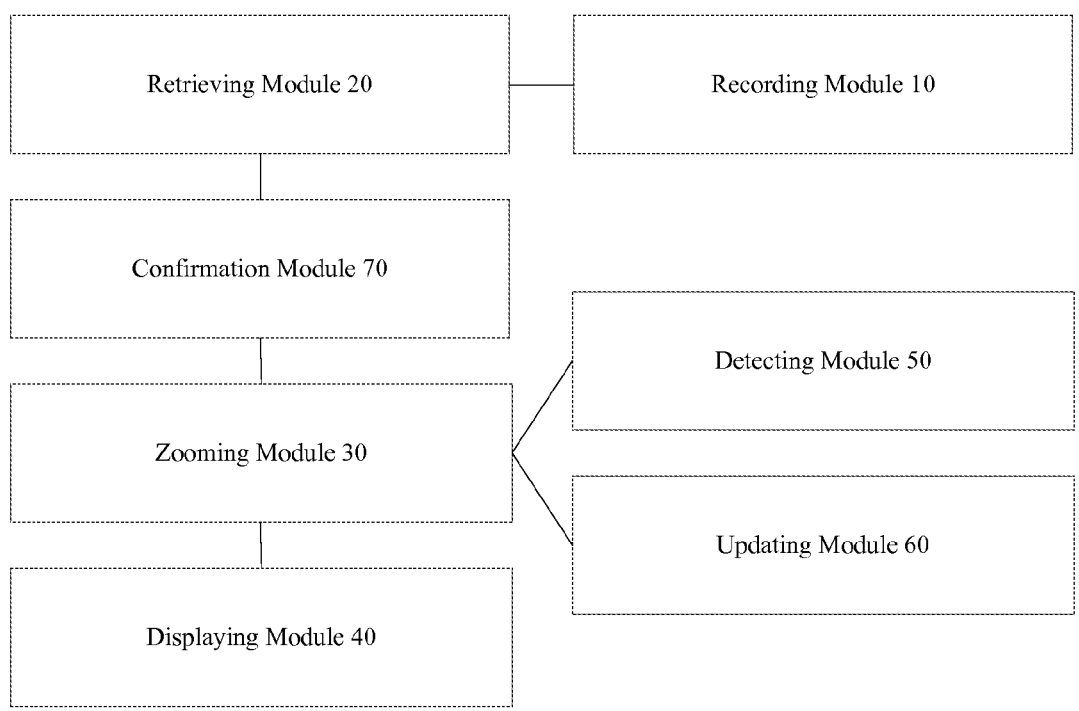
FIG. 4 illustrates a block diagram of another preferred webpage display device according to the embodiment of the present invention.

FIG. 4 illustrates a block diagram of another preferred webpage display device according to the embodiment of the present invention. As shown in FIG. 4, the device also includes: a confirmation module 70 is coupled with the zooming module 30 and is configured to prompt the user to confirm whether to zoom the size of the webpage according to the zoom ratio retrieved by the retrieving module 20. If confirmed, the zooming module 30 is triggered to zoom the size of the webpage according to the retrieved zoom ratio. If not confirmed, the zooming module 30 is triggered to zoom the size of the webpage according to pre-configured zoom ratio.

In the preferred embodiment described above, after a zooming operation performed by the user on a webpage, the device records a mapping relationship between a webpage identifier of the webpage and a zoom ratio of the zooming operation. In the above mapping relationships, the same webpage identifier maps to one zoom ratio. According to the preferred implementation of the embodiment of the present invention, the domain name of the webpage can be used as the webpage identifier of the webpage. All webpages with identical domain name share one zoom ratio. The zoom ratio is recorded under the domain name of the webpages. In addition, the device also uses the unified resource locator (URL) of the webpage as the webpage identifier of the webpage. All webpages with identical URL share one zoom ratio. The zoom ratio is recorded under the URLs of the webpages. Hence the stored mapping relationships between the webpages and the zoom ratios are the mapping relationships between either the domain names of the webpages or the URLs of the webpages and the zoom ratios of the webpages.

According to the embodiment of the present invention, there also provides a browser, which can also include the above webpage display device.

According to the embodiment of the present invention, there also provides a user terminal, which includes the above browser.

Embodiment Four

The embodiment of the present invention also provides another webpage display method, which uses the font size of the webpage to adjust the zoom ratio of the webpage.

Figure 5:
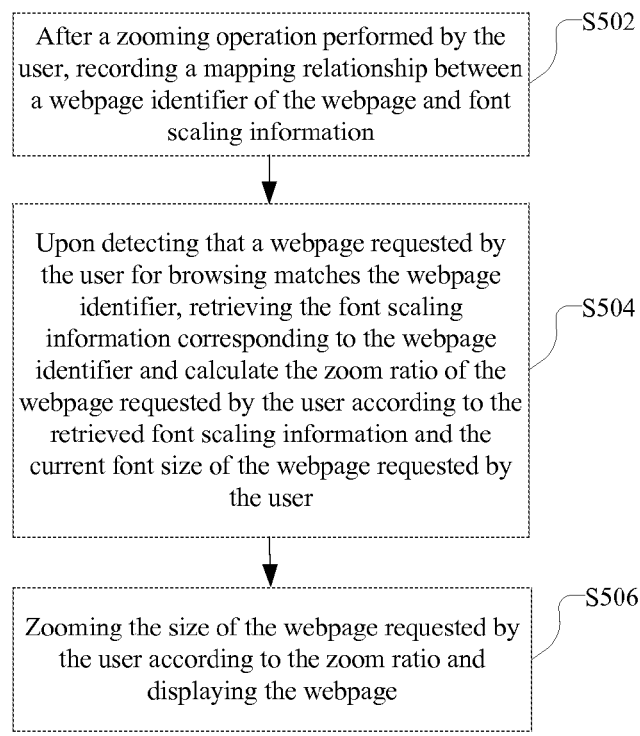
FIG. 5 illustrates a flow chart of a webpage display method according to the embodiment four of the present invention.

FIG. 5 illustrates a flow chart of the webpage display method according to the embodiment four of the present invention. As shown in FIG. 5, the method mainly includes step S502 through step S506.

Step S502, after the user performs a zooming operation on a webpage currently being browsed, recording the mapping relationship between the webpage identifier of the webpage and the font scaling information.

Step S504, upon detecting that a webpage requested by the user for browsing matches the above described webpage identifier, retrieving the recorded font scaling information corresponding to the webpage identifier and calculating the zoom ratio of the webpage requested by the user according to the retrieved font scaling information and the current font size of the webpage requested by the user.

Step S506, zooming the size of the webpage requested by the user according to the above zoom ratio and displaying the webpage.

According to the embodiment of the present invention, the webpage is zoomed according to the font size information of the webpage being browsed by the user, making the font sizes of the webpages corresponding to the same webpage identifier consistent, improving the user experience.

In one embodiment of the present invention, the above described font scaling information includes: the font size after a zooming operation performed by the user. At this point, the following formula may be used to determine the zoom ratio: $Y_1=X_1/X_2$, wherein, $Y_1$ is the zoom ratio, $X_1$ is the font size after the zooming operation is performed, $X_2$ is the current font size of the webpage requested by the user.

In another embodiment of the present invention, the above described font scaling information includes: the font size before the zooming operation is performed and the font zoom ratio for performing the zooming operation. At this point, the following formula may be used to determine the current zoom ratio: $Y_3=X_3*Y_2/X_4$, wherein, $Y_3$ is the zoom ratio, $X_3$ is the font size before the zooming operation is performed, $Y_2$ is the font zoom ratio for performing the zooming operation, $X_4$ is the current font size of the webpage requested by the user.

Preferably, the above webpage identifier includes but is not limited to: a domain name of the webpage or a URL of the webpage.

For example, A, B and C are three webpages with identical domain name. The average font size of webpage A is 18. The average font size of webpage B is 16. The average font size of webpage C is 20. When browsing webpage B, the user performs a zooming operation on the webpage and makes the font size of webpage B become 20. At this point, the user recorded font size of the webpage for the domain name is 16, so the zoom ratio of the webpage is 125%. When the user browses webpages A and C which share the same domain name with webpage B, the above formula gives the zoom ratio 16*125%/18, i.e., 111%, for webpage A and the zoom ratio 100% for webpage C. The calculated zoom ratios are used to zoom and display the webpages A and C.

In one embodiment of the present invention, after using the above calculated zoom ratio to zoom the size of the webpage requested by the user and display the webpage, the webpage display method can also detect the user's further zooming operation on the webpage requested by the user, respond to the user's zooming operation, zoom the size of the webpage requested by the user, and update the font scaling information corresponding to the webpage identifier to the font scaling information of the current zooming operation in the above described mapping relationship. When the user browses the current webpage, the updated zoom ratio can be used to display the webpage. Subsequently, the extra zooming operation by the user can be avoided.

Embodiment Five

The embodiment of the present invention also provides a webpage display device, which implements the method in the embodiment four of the present invention.

Figure 6:
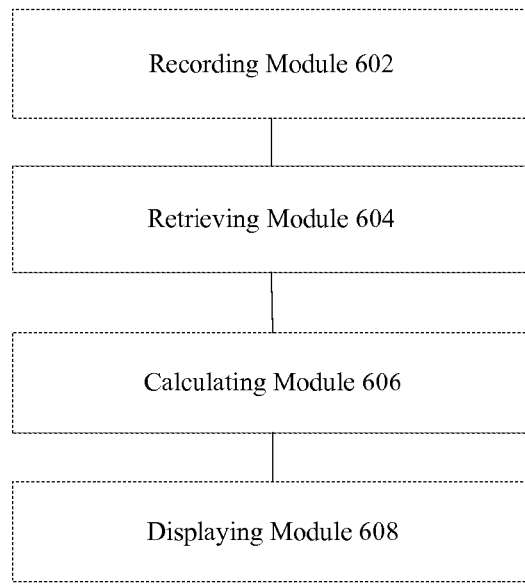
FIG. 6 illustrates a block diagram of a webpage display device according to the embodiment five of the present invention.

FIG. 6 illustrates a block diagram of the webpage display device according to the embodiment five of the present invention. As shown in FIG. 6, the device mainly includes: a recording module 602, a retrieving module 604, a calculating module 606, and a displaying module 608. Among them, the recording module 602 is configured to, after a zooming operation performed by the user on the webpage currently being browsed by the user, record a mapping relationship between a webpage identifier of the current webpage and a font scaling information; the retrieving module 604 is coupled with the recording module 602 and is configured to retrieve the font scaling information corresponding to the webpage identifier upon detecting that a webpage requested by the user for browsing matches the webpage identifier; the calculating module 606 is coupled with the retrieving module 604 and is configured to calculate the zoom ratio of the webpage requested by the user according to the retrieved font scaling information and the current font size of the webpage requested by the user; and the displaying module 608 is configured to zoom the size of the webpage requested by the user according to the zoom ratio and display the webpage.

According to the embodiment of the present invention, the font size information of the webpage being browsed by the user is used to zoom the webpage, which makes the font sizes of the webpages corresponding to the same domain name consistent. Subsequently, the user experience can be improved.

In one embodiment of the present invention, the font scaling information includes: the font size after a zooming operation is performed. At this point, the calculating module 606 uses the following formula to determine the zoom ratio: $Y_1 = X_1/X_2$, wherein, $Y_1$ is the zoom ratio, $X_1$ is the font size after the zooming operation is performed, $X_2$ is the current font size of the webpage requested by the user.

In another embodiment of the present invention, the font scaling information includes: the font size before the zooming operation is performed and the font scaling ratio for performing the zooming operation. At this point, the calculating module 606 uses the following formula to determine the current zoom ratio: $Y_3 = X_3 * Y_2/X_4$, wherein, $Y_3$ is the zoom ratio, $X_3$ is the font size before the zooming operation is performed, $Y_2$ is the font size zoom ratio for performing the zooming operation, $X_4$ is the current font size of the webpage requested by the user.

In one embodiment of the present invention, the device also includes: a detecting module, configured to detect the user's further zooming operation on the webpage requested by the user. The displaying module 608 is also configured to respond to the user's zooming operation and to zoom the size of the webpage requested by the user. The device may also include: an updating module configured to update the font scaling information corresponding to the webpage identifier to the font scaling information of the current zooming operation in the mapping relationship. In a preferred embodiment, when the user browses the current webpage next time, the updated zoom ratio can be used to display the webpage, avoiding the extra zooming operation by the user.

From the above descriptions, it can be seen that, the present invention achieves the following technical effects: after the user performs a zooming operation on the webpage, the mapping relationship between the webpage identifier of the webpage and the zoom ratio of the zooming operation can be recorded; upon detecting that a webpage requested by the user for browsing matches the webpage identifier, the recorded zoom ratio corresponding to the webpage identifier can be retrieved; the size of the webpage requested by the user can be zoomed according to the retrieved zoom ratio, and the zoomed webpage can be displayed. Thus, the webpage is directly zoomed to the size suitable for user browsing; avoiding the extra zooming operation by the user and improving the user experience of webpage browsing. Further, the user's zooming operation can be detected, the zoom ratio of the webpage can be recorded or updated as the zoom ratio after the zooming operation is performed, and when the webpage is opened next time, the webpage can be displayed according to the updated zoom ratio. Further, using the domain name or the URL of the webpage as the identifier to distinguish the webpage simplifies the technical solutions of the present invention.

Obviously, it should be noted that the above described modules and processes of the present invention may be implemented on any generic computing device. They can be centralized on single computing device or distributed over multiple computing devices connected through a network. Optionally, they can be implemented in the programming code loaded on computing device so that they can be stored in the memory and executed by the computing device. Under certain circumstances, they can be executed in the sequence other than described above. Optionally, they can be implemented by multiple integrated circuit modules, or can be consolidated into single integrated circuit module. Therefore, the present invention is not limited to any particular hardware and/or software combination.

The above described are only preferred embodiments of the present invention and are not intended to limit the present invention. To those skilled in the art, the present invention may have various changes and variations. Within the spirit and principles of the present invention, any modification, equivalent replacement, improvement, etc., should be included in the scope of the protection of the present invention.

The invention claimed is:

1. A webpage display method, comprising:

acquiring a mapping relationship between a user terminal type, a webpage identifier, and a zoom ratio, from an external source, wherein:

the mapping relationship includes a plurality of different types of user terminals, each different user terminal type corresponding to a plurality of different webpages, each different webpage having one webpage identifier, and each webpage identifier corresponding to one zoom ratio;

upon detecting that a webpage having a webpage identifier requested by a user of a user terminal type for browsing matches the webpage identifier in the acquired mapping relationship for the user terminal type, retrieving a zoom ratio corresponding to the matched webpage identifier; and zooming a size of the detected webpage requested by the user according to the retrieved zoom ratio and displaying the zoomed webpage, wherein the webpage identifier includes a domain name of the webpage from the plurality of different webpages, the zoom ratio is recorded associated with the domain name in a local file, and webpages from the plurality of different webpages sharing the domain name are mapped to the zoom ratio associated with the domain name.

2. The method according to claim 1, wherein, after zooming the size of the webpage requested by the user according to the retrieved zoom ratio and displaying the webpage, the method further includes:

detecting a user's zooming operation on the webpage requested by the user;

responding to the user's zooming operation and zooming the size of the webpage requested by the user; and updating the zoom ratio corresponding to the webpage identifier to the zoom ratio of the current zooming operation in the mapping relationship.

3. The method according to claim 1, wherein, before zooming the size of the webpage according to the retrieved zoom ratio, the method further includes:

prompting the user to confirm whether to zoom the size of the webpage according to the zoom ratio;

when confirmed, zooming the size of the webpage requested by the user according to the retrieved zoom ratio; and when not confirmed, zooming the size of the webpage requested by the user according to a pre-configured zoom ratio.

4. A webpage display device, comprising:

a hardware user terminal, configured to:

acquire a mapping relationship between a user terminal type, a webpage identifier, and a zoom ratio, from an external source, wherein:
the mapping relationship includes a plurality of different types of user terminals, each different user terminal type corresponding to a plurality of different webpages, each different webpage having one webpage identifier, and each webpage identifier corresponding to one zoom ratio;
upon detecting that a webpage having a webpage identifier requested by a user of a user terminal type for browsing matches the webpage identifier in the acquired mapping relationship for the user terminal type, retrieve a zoom ratio corresponding to the matched webpage identifier;
zoom a size of the detected webpage requested by the user according to the retrieved zoom ratio; and
display the zoomed webpage requested by the user according to the zoomed size;
wherein the webpage identifier includes a domain name of the webpage from the plurality of different webpages, the zoom ratio is recorded associated with the domain name in a local file, and webpages from the plurality of different webpages sharing the same domain name are mapped to the zoom ratio associated with the domain name.

5. The device according to claim 4, wherein:
the device further includes a detecting module configured to detect a user's zooming operation on the webpage requested by the user after the displaying module displays the webpage requested by the user;
the zooming module is further configured to respond to the user's zooming operation and to zoom a size of the webpage requested by the user;
the device further includes an updating module configured to update the zoom ratio corresponding to the webpage identifier to the zoom ratio of the current zooming operation in the mapping relationship.

6. The device according to claim 4, further including:
a confirmation module configured to, before the zooming module zooms the webpage requested by the user:
prompt the user to confirm whether to zoom the size of the webpage requested by the user according to the zoom ratio;
when confirmed, trigger the zooming module to zoom the size of the webpage requested by the user according to the retrieved zoom ratio; and
when not confirmed, trigger the zooming module to zoom the size of the webpage requested by the user according to a preconfigured zoom ratio.

7. A webpage display method, including:
after a zooming operation performed by a user on a first webpage currently being browsed and having a first unified resource locator (URL), recording a mapping relationship between a webpage identifier of the first webpage and font scaling information;
upon detecting that a second webpage having a second URL requested by the user for browsing matches the webpage identifier, retrieving the recorded font scaling information corresponding to the webpage identifier, calculating a zoom ratio ($Y_3$) for the second webpage according to the retrieved font scaling information, including a font size ($X_3$) of the first webpage before the zooming operation and a font zoom ratio ($Y_2$) for performing the zooming operation, and a current font size ($X_4$) of the second webpage, by applying a formula of: $Y_3=X_3*Y_2/X_4$; and
zooming a size of the second webpage requested by the user according to the zoom ratio ($Y_3$) of the applied formula and displaying the second webpage;
wherein the webpage identifier is a domain name of the first webpage, the font scaling information is recorded associated with the domain name in a local file, and webpages sharing the same domain name are mapped to the recorded font scaling information associated with the domain name.

8. The method according to claim 7, wherein the font scaling information includes a font size after a zooming operation is performed; and the zoom ratio is determined by using a formula of:
$Y_1=X_1/X_2$, wherein, $Y_1$ is the zoom ratio, $X_1$ is the font size of the first webpage after a zooming operation is performed, $X_2$ is the current font size of the second webpage requested by the user.

9. The method according to claim 7, wherein, after zooming the size of the second webpage requested by the user according to the zoom ratio and displaying the second webpage, the method further includes:
detecting the zooming operation by the user on the second webpage requested by the user;
responding to the user's zooming operation and zooming a size of the second webpage requested by the user;
updating the font scaling information corresponding to the webpage identifier to the font scaling information of the current zooming operation in the mapping relationship.

10. The method according to claim 7, wherein the webpage identifier further includes a unified resource locator (URL) of the first webpage.

11. A webpage display device, comprising:
a hardware user terminal, configured to:
after a zooming operation performed by a user on a first webpage currently being browsed and having a first unified resource locator (URL), record a mapping relationship between a webpage identifier of the first webpage and font scaling information;
upon detecting that a second webpage having a second URL requested by the user for browsing matches the webpage identifier, retrieve the recorded font scaling information corresponding to the webpage identifier;
calculate a zoom ratio ($Y_3$) of the second webpage according to the retrieved font scaling information, including a font size ($X_3$) of the first webpage before the zooming operation and a font zoom ratio ($Y_2$) for performing the zooming operation, and a current font size ($X_4$) of the second webpage, by applying a formula of: $Y_3=X_3*Y_2/X_4$; and
zoom a size of the second webpage requested by the user according to the zoom ratio ($Y_3$) of the applied formula and to display the second webpage;
wherein the webpage identifier is a domain name of the first webpage, the font scaling information is recorded associated with the domain name in a local file, and webpages sharing the same domain name are mapped to the recorded font scaling information associated with the domain name.

12. The device according to claim 11, wherein the font scaling information includes a font size after a zooming operation is performed; and the zoom ratio is determined by using a formula of:.
$Y_1=X_1/X_2$, wherein, $Y_1$ is the zoom ratio, $X_1$ is the font size of the first webpage after a zooming operation is performed, $X_2$ is the current font size of the second webpage requested by the user.

13. The device according to claim 11, wherein, after zooming the size of the second webpage requested by the user according to the zoom ratio and displaying the second webpage, the method further includes:
- detecting the zooming operation by the user on the second webpage requested by the user;
- responding to the user's zooming operation and zooming a size of the second webpage requested by the user;
- updating the font scaling information corresponding to the webpage identifier to the font scaling information of the current zooming operation in the mapping relationship.

14. The device according to claim 11, wherein the webpage identifier further includes a unified resource locator (URL) of the first webpage.

* * * * *